ated Jan. 7, 1969

3,420,840
FLUORINATED COMPOUNDS

Giuliana C. Tesoro, Dobbs Ferry, N.Y., and Richard N. Ring, Wood-Ridge, N.J., assignors to J. P. Stevens & Co., Inc., New York, N.Y., a corporation of Delaware
No Drawing. Filed Aug. 4, 1960, Ser. No. 47,350
U.S. Cl. 260—296                                3 Claims
Int. Cl. C07d 31/22; C07c 43/12; C07c 93/04

This invention relates to new and useful classes of reactive fluorocarbon compounds. More specifically this invention relates to new aliphatic fluorinated halomethyl ethers and quaternary ammonium compounds derived from said ethers and to methods of making the same. The fluorinated halomethyl ethers have utility as intermediates in chemical synthesis of other fluorinated compounds, and as reagents for polymer modification. The quaternary ammonium compounds derived from the halomethyl ethers are useful as surface active agents, as reagents for polymer modification, as surface treating and coating agents, as textile finishing agents, as water and oil repellents for fabrics, and for other purposes.

Accordingly it is an object of this invention to provide a new class of useful fluorine containing organic compounds.

Another object is to provide new and useful fluorine-containing halomethyl ethers and a process for their manufacture.

Another object of the present invention is to provide new and useful quaternary ammonium compounds containing fluorinated groups, and a process for their manufacture.

Other objects and advantages of the invention will become apparent from the description and examples which follow.

These new compounds, which are characterized by having in the molecule a fluorinated group, which is both hydrophobic and oleophobic, can be represented by the generic formula (1) 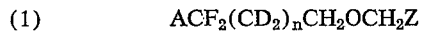

where A is selected from the group consisting of hydrogen, fluorine, XCH$_2$OCH$_2$— and

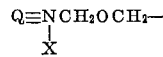

D is selected from the group consisting of hydrogen, chlorine fluorine; $n$ is a number from 0 to 11; Z is selected from the group consisting of

and —X where X is a halogen and N≡Q is a cationogenic group containing the quaternary nitrogen atom N electrostatically bonded to the halogen ion X, and covalently bonded to the residue Q which represents an organic terminal structure which satisfies three of the covalencies of the quaternary nitrogen atom by means of carbon-nitrogen bonds.

The preparation of the fluorinated halomethyl ethers, which for the purpose of discussion will be represented simply by a generic formula (2) 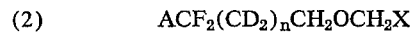

where A, D, $n$, and X have the same meaning as in Formula 1, can be carried out from the corresponding hydroxyl compounds by reaction with formaldehyde and halogen acid. However, we have found that the necessary reaction conditions (reactant ratios, choice of solvent, exclusion of moisture, and reaction temperature) differ greatly from those employed in the preparation of non-fluorinated halomethyl ethers. For example, the chloromethyl ether of a non-fluorinated aliphatic alcohol may be prepared in good yield simply by passing hydrogen chlorine gas into an undiluted mixture of stoichiometric amounts of formaldehyde and the aliphatic alcohol. When the preparation of the fluoroalkyl chloromethyl ethers of the present invention was attempted by this method, the products formed contained no chlorine; and it is believed that the formation of acetals predominated, making the yield of the desired product insignificant.

On the other hand good yields of the desired products were obtained by employing:

(a) A ratio of formaldehyde to hydroxyl group exceeding 1.5,
(b) An inert diluent such as an ether or hydrocarbon solvent in amount at least equal to the weight of reactants, and
(c) A reaction temperature not exceeding 30° C.

The hydroxyl compounds which can be employed in the preparation of the new compounds are fluorinated alcohols, for example:

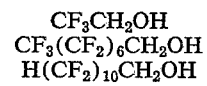

and the like, or they may be fluorinated glycols such as for example

or any related compounds.

The formaldehyde is used preferably in anhydrous form. The commercial formaldehyde polymers such as paraformaldehyde and trioxane are excellent reagents for this process.

The organic solvent employed must not contain reactive groups such as hydroxyl, and must be inert. Diethyl ether, petroleum ether, ethylene glycol and dimethyl ether are particularly effective.

The fluorinated halomethyl ethers are colorless mobile liquids which are stable in the absence of moisture. In the presence of water, and particularly in the presence of an inorganic base, they are rapidly hydrolyzed, forming alcohol (or glycol), formaldehyde and halogen acid. The fluorinated halomethyl ethers are insoluble in water, and soluble in common organic solvents. They are excellent alkylating agents for organic bases, and this property is illustrated by the preparation of the new fluorinated quaternary ammonium compounds which is described hereinbelow.

The preparation of the fluorinated quaternary ammonium compounds, which can be represented by the generic formula (3) 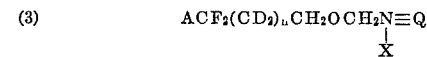

where A, D, and

have the same meaning as in Formula 1 above, can be carried out by adding the fluorinated halomethyl ether to a solution of a tertiary amine (in excess of the stoichiometric amount calculated) in a suitable organic solvent, with cooling and stirring, and continuing the reaction until the halogen of the halomethyl group is completely converted to ionic halogen as indicated by argentometric titration. The reverse order of addition (amine to halomethyl ether) may also be employed. The solvent used for the preparation of the quaternary ammonium compound must be free of moisture, since the presence of moisture causes hydrolysis of the halomethyl group, with concomitant low yields of the quaternary ammonium compound and formation of amine hydrochloride. Furthermore, it is desirable to employ a solvent in which the quaternary ammonium compound is not soluble, since it is convenient to isolate the product by simple filtration. Suitable solvents are, for example, dioxane, aliphatic ethers and hydrocarbon solvents. The tertiary amine used in the preparation of the quaternary ammonium compounds, which corresponds to the group N≡Q in generic Formula 3, may be cyclic or acyclic, aliphatic or aromatic. It must, however, be a weak base, since the presence of a strong base tends to cause decomposition of the halomethyl ether. Generally, any tertiary amine having an ionization constant of about $10^{-8}$ or lower may be used. Dimethyl aniline, diethyl aniline, pyridine, lutidine, picoline, quinoline, and isoquinoline are satisfactory tertiary amines. The quaternary ammonium compounds are hygroscopic, white crystalline solids which do not have characteristic melting points but decompose on heating. They are soluble to sparingly soluble in water and in oils. The solubility depends on several structural factors such as the total number of carbon atoms in the molecule, the length of the chain designated as $ACF_2(CD_2)_n$, and the number of fluorinated carbon atoms present.

The following examples are illustrative of the present invention and are not to be construed as limiting thereto.

EXAMPLE 1

$CF_3CH_2OCH_2Cl$

Trifluoroethanol (105 g., 1.05 moles) was slowly added to 5° to 10° C. to a stirred mixture of 136 g. of paraformaldehyde (4.3 moles), 50 ml. of 1,2-dimethoxyethane (dimethyl ether of ethylene glycol) as solvent [1] and 400 ml. of petroleum ether solvent (fraction boiling at 30–60° C.) while anhydrous hydrogen chloride was passed into the mixture through a gas inlet tube. After reacting for six hours at 10°–20° C., the mixture was dried over calcium chloride and distilled.

The following fractions were obtained:

| B.P.: | Percent |
|---|---|
| (1) 43–48°/28–30 mm. | 15.5 Cl |
| (2) 47–58°/18–19 mm. | 20.2 |
| (3) 51–61°/9–14 mm. | 23.1 |

Calculated chlorine for 2,2,2-trifluoroethyl chloromethyl ether, $C_3H_4ClF_3O$, is 23.3%.

It is apparent that Fractions 2 and 3 consisted mainly of the desired product, while Fraction 1 was contaminated by impurities. The yield of desired product was 50%.

EXAMPLE 2

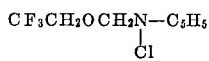

Pyridine (24 g., 0.3 mole) was slowly added to a stirred solution of 45 g. of 2,2,2-trifluoroethyl chloromethyl ether, product of example, (87% purity based on chlorine analysis, 0.26 mole) in 50 ml. of dioxane maintaining the temperature at 10–20° C. by means of a cooling bath. A white solid precipitated in the course of the addition, and was removed from the mixture by filtration after standing for several hours. The product was dried in a vacuum desiccator. A 48% yield of white hygroscopic solid was obtained. The calculated equivalent weight for 2,2,2-trifluoroethoxymethyl pyridinium chloride is 228. The crude product obtained in this preparation had an equivalent weight of 190 as determined by chloride analysis. The product was completely soluble in cold water.

EXAMPLE 3

$HCF_2(CF_2)_5CH_2OCH_2Cl$

A mixture of 454 g. of technical 1H, 1H, 7H-dodecafluoro-1-heptanol (1.4 moles), 230 g. of paraformaldehyde (7.7 moles) and 2000 ml. of petroleum ether was chilled to 5° C. by means of a cooling bath, and anhydrous hydrogen chloride was slowly passed into the cooled, mechanically stirred mixture. The addition was continued for five hours while the temperature was maintained at 5–15° C. The mixture was dried over calcium chloride, and distilled.

The following fractions were obtained:

| B.P.: | Percent |
|---|---|
| (1) 94–109°/9 mm. | 11.2 Cl |
| (2) 111–122°/9 mm. | 9.47 |
| (3) 122°/9 mm.–115°/3 mm. | 8.30 |

Calculated chlorine for 1H, 1H, 7H-dodecafluoro-1-heptyl chloromethyl ether, $C_8H_5ClF_{12}O$, is 9.34%.

The distilled product, obtained in 40% yield, was a colorless mobile liquid which slowly liberated formaldehyde and hydrogen chloride in the presence of moisture, but was stable when kept at room temperature under anhydrous conditions.

EXAMPLE 4

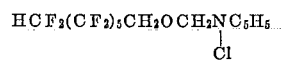

Pyridine (13 g., 0.16 mole) was slowly added with stirring to a solution of 56 g. of 1H, 1H, 7H-dodecafluoro-1-heptyl chloromethyl ether (0.15 mole) (product of Example 3) in 150 ml. of petroleum ether at 0–10° C. The white solid which precipitated from the mixture after standing overnight at room temperature was dried in a vacuum desiccator. An 80.0% yield of a white hygroscopic solid with an equivalent weight of 447 was obtained. The calculated equivalent weight for 1H, 1H, 7H-dodecafluoro-1-heptyloxymethyl pyridinium chloride is 460.

EXAMPLE 5

$CF_3(CF_2)_6CH_2OCH_2Cl$

A solution of 100 g. of perfluorooctanol (0.25 mole) in 50 ml. of 1,2-dimethoxyethane was slowly added to a stirred mixture of 41 g. of paraformaldehyde (1.37 moles) and 600 ml. of petroleum ether (B.P. 30–60° C.) at 0–10° C. as anhydrous hydrogen chloride was passed into the mixture through a gas inlet tube. After a six hour reaction period the mixture was dried over calcium chloride, and the solvent was removed by vacuum distillation. Dioxane (130 ml.) was added to the residue and the mixture was filtered. Dry nitrogen was passed through the filtrate to remove residual hydrogen chloride. The resulting solution contained 3.7% chlorine. Calculated chlorine for 1H, 1H-pentadecafluoro-1-octyl chloromethyl ether, $C_9H_4ClF_{15}O$, is 7.92%. The concentration of product in solution, calculated from the chloride content was 47%. This crude product could be used in the preparation of the quaternary ammonium compounds without further purification.

EXAMPLE 6

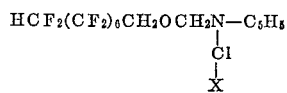

260 g. of a dioxane solution of 1H, 1H, perfluorooctyl chloromethyl ether obtained according to the procedure of Example 5 and containing about 0.2 mole of product were cooled to 5–10° C. and 19 g. of pyridine (0.24 mole) was slowly added with stirring. A white precipitate was obtained which was collected on a filter after standing overnight and then dried in a vacuum desiccator. An 81% yield (92 grams) of white, hygroscopic, water soluble solid product with an equivalent weight of 484 was obtained. The calculated equivalent weight for 1H, 1H-perfluorooctyloxymethyl pyridinium chloride is 528.

---

[1] Marketed under the trade name of Ansul 121 solvent by the Ansul Chemical Co.

EXAMPLE 7

HCF$_2$(CF$_2$)$_7$CH$_2$OCH$_2$Cl

A solution of 455 g. of technical 1H, 1H, 9H-hexadecafluoro-1-nonanol (1 mol) in 150 ml. of 1,2-dimethoxyethane was slowly added at 5–10° C. to a stirred mixture of 128 g. of paraformaldehyde (4.20 moles) dissolved in 1800 ml. of petroleum ether (B.P. 30–60° C.) and containing 100 ml. of 1,2-dimethoxyethane while passing anhydrous hydrogen chloride into the mixture. After a six hour reaction period the mixture was dried over calcium chloride. The solvent and some residual hydrogen chloride were removed by vacuum distillation. The hydrogen chloride which still remained was removed by passing dry nitrogen through the mixture. The clear liquid residue (557 g.) contained 6.72% chlorine. Calculated chlorine for 1H, 1H, 9H-hexadecafluoro-1-nonyl chloromethyl ether, C$_{10}$H$_5$ClF$_{16}$O, 7.38%. A quantitative yield of the dioxane soluble product was obtained based on the chlorine content of the residue.

EXAMPLE 8

$$\text{HCF}_2(\text{CF}_2)_7\text{CH}_2\text{OCH}_2\overset{|}{\underset{\text{Cl}}{\text{N}}}\text{C}_5\text{H}_5$$

Pyridine (91.0 g., 1.15 moles) was slowly added with stirring to a solution of 505 g. of 1H, 1H, 9H-hexadecafluoro-1-nonyl chloromethyl ether (1.05 moles) (product obtained according to the procedure of Example 7) in 500 ml. of anhydrous dioxane at 5–10° C. The white solid which precipitated was collected on the following morning and dried in a vacuum desiccator. A 48% yield (284 g.) of a white hygroscopic solid was obtained. The product was soluble in water and in alcohols at room temperature.

EXAMPLE 9

HCF$_2$(CF$_2$)$_9$CH$_2$OCH$_2$Cl

A solution of 455 g. of technical 1H, 1H, 11H-"eicosafluoro-1" undecanol (0.86 mole) in 140 ml. of 1,2-dimethoxyethane was slowly added to a stirred mixture of 141 g. of paraformaldehyde (4.7 moles) and 2000 ml. of petroleum ether (B.P. 30–60° C.) at 5–15° C. as anhydrous hydrogen chloride was also passed into the mixture. An additional 130 ml. of 1,2-dimethoxyethane was added during the course of the reaction in order to prevent the alcohol from precipitating. After a 5 hour reaction period, the mixture was dried over calcium chloride and the solvent was removed by distillation. A low melting solid residue (486 g.) was obtained in 97% yield. Chlorine found 6.15%. Calculated chlorine for 1H, 1H, 11H-eicosafluoro-1-undecyl chloromethyl ether, C$_{12}$H$_5$ClF$_{20}$O, 6.12%.

EXAMPLE 10

$$\text{HCF}_2(\text{CF}_2)_9\text{CH}_2\text{OCH}_2\overset{|}{\underset{\text{Cl}}{\text{N}}}\text{C}_5\text{H}_5$$

Dry nitrogen was passed through a solution of 172 g. of crude 1H, 1H, 11H-eicosafluoro-1-undecyl chloromethyl ether in 170 ml. of dioxane to remove residual hydrogen chloride and the resulting solution was found to contain 0.27 equivalent of chlorine. The mixture was cooled to 10° C. and 23.7 g. of pyridine (0.3 mole) in 25 ml. of dioxane was slowly added with stirring. As the white solid product formed it was necessary to add additional dioxane to maintain efficient stirring of the reaction mixture. After standing overnight at room temperature, the white solid was collected on a filter and dried in a vacuum desiccator.

An 83% yield of white hygroscopic solid product (145 g.) was obtained. The calculated equivalent weight for 1H, 1H, 11H-eicosafluoro-1-undecyloxymethyl pyridinium chloride is 659. The equivalent weight of the crude product obtained in this preparation was found to be somewhat higher than calculated (794). The product could be purified by repeatedly washing with organic solvents. The product exhibited excellent solubility in alcohols, and some solubility in water. The surface active nature of this product was apparent in the behaviour of its solutions.

Example 11

$$\text{ClCH}_2\text{OCH}_2(\text{CF}_2)_3\text{CH}_2\text{OCH}_2\text{Cl}$$

and $$\text{C}_5\text{H}_5\text{NCH}_2\text{OCH}_2(\text{CF}_2)_3\text{CH}_2\text{OCH}_2\text{NC}_5\text{H}_5$$
$$\underset{\text{Cl}}{|} \quad \underset{\text{Cl}}{|}$$

Anhydrous hydrogen chloride was passed into a mixture of 90.0 g. of paraformaldehyde (3.0 moles) and 130 ml. of 1,2-dimethoxyethane containing 35 g. of CaCl$_2$ as a drying agent at 5–10° C. for about one hour. A solution of 64 g. of 2,2,3,3,4,4-hexafluoropentanediol (0.3 mol.) in 65 ml. of 1,2-dimethoxyethane was then slowly added to the stirred mixture maintaining the temperature at 5–10° C. Hydrogen chloride addition was then continued at room temperature for a total of 14 hours. The reaction mixture was filtered and concentrated under reduced pressure to remove excess hydrogen chloride. The 340 g. residue still contained a significant amount of hydrogen chloride which could not be removed by sweeping with nitrogen. In order to remove the acid, it was necessary to treat the product with anhydrous potassium bicarbonate and filter the resulting slurry after evolution of carbon dioxide had subsided. It was also possible to remove residual HCl by vacuum stripping for several hours. After removing the residual acid, the product was obtained as a clear colorless liquid. Purification by vacuum distillation was attempted without success, and the crude product was used in the preparation of the highly water soluble fluorinated bis quaternary ammonium compound, $$\text{C}_5\text{H}_5\text{NCH}_2\text{OCH}_2(\text{CF}_2)_3\text{CH}_2\text{OCH}_2\text{NC}_5\text{H}_5$$
$$\underset{\text{Cl}}{|} \quad \underset{\text{Cl}}{|}$$

by reaction with pyridine.

While the illustrative embodiments of the invention have been described hereinbefore with particularity, it will be apparent to and that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as patentable equivalents thereof by those skilled in the art to which the invention pertains.

What we claim is:

1. A polyfunctional fluorinated compound selected from the group consisting of compounds of the structure:

$$\text{XCH}_2\text{OCH}_2\text{—CF}_2(\text{CD}_2)_n\text{CH}_2\text{OCH}_2\text{X}$$

and $$Q \equiv \text{NCH}_2\text{OCH}_2\text{—CF}_2(\text{CD}_2)_n\text{CH}_2\text{OCH}_2\text{N} \equiv Q$$
$$\underset{X}{|} \qquad \qquad \underset{X}{|}$$

wherein

D is selected from the group consisting of hydrogen, chlorine and fluorine;

$n$ is a number from 0 to 11; and

X is selected from the group consisting of chlorine and and bromine; and $$\underset{X}{\overset{N \equiv Q}{|}}$$

is a cationogenic group containing the quaternary N atom electrostatically bonded to the halogen ion X and covalently bonded to the residue, Q, of a tertiary amine, said tertiary amine being selected from the group consisting of dimethyl aniline, diethyl aniline, pyridine, lutidine, picoline, quinoline and isoquinoline.

2. 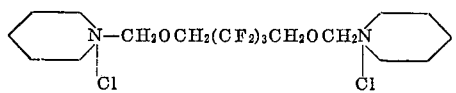

3. $ClCH_2OCH_2(CF_2)_3CH_2OCH_2Cl$

References Cited

UNITED STATES PATENTS

| | | | |
|---|---|---|---|
| 2,727,923 | 12/1955 | Husted | 260—567.6 |
| 2,767,189 | 10/1956 | Erickson | 260—567.6 |
| 2,812,350 | 11/1957 | Niederhauser | 260—567.6 |

OTHER REFERENCES

Park et al.: J. Am. Chem. Soc., vol. 74, pp. 2292–4 (1952).

Knunyants et al.: Chem. Abstracts, vol. 43, col. 6163 (1949).

Brey et al.: J. Am. Chem. Soc., vol. 79, pp. 6533–6 (1957).

Jarvis et al.: J. Phys Chem, vol. 63, pp. 727–734 (1959).

Klingsberg: "Pyridine and Its Deriv.", part two pp. 5–6 (1961). Copies in Scientific Library.

HENRY R. JILES, *Primary Examiner.*

R. T. BOND, *Assistant Examiner.*

U.S. Cl. X.R.

252—8.8, 8.9, 357; 260—290, 297, 287, 288, 614, 567.6, 615, 2